United States Patent [19]

Yasui

[11] Patent Number: 4,839,981
[45] Date of Patent: Jun. 20, 1989

[54] FISHING ROD
[75] Inventor: Toshihiko Yasui, Sakai, Japan
[73] Assignee: Shimano Industrial Company Limited, Osaka, Japan
[21] Appl. No.: 210,977
[22] Filed: Jun. 24, 1988
[30] Foreign Application Priority Data May 21, 1988 [JP] Japan .............................. 63-67251[U]

[51] Int. Cl.⁴ ...................... A01K 87/00; A01K 87/06
[52] U.S. Cl. ...................................... 43/18.1; 43/18.5; 43/20; 43/22; 43/23; 43/25
[58] Field of Search ................ 43/18.1, 18.5, 20, 21.2, 43/22, 23, 25

[56] References Cited

U.S. PATENT DOCUMENTS

| | | | |
|---|---|---|---|
| 1,452,808 | 4/1923 | Lee | 43/20 |
| 2,003,893 | 6/1935 | LaPan | 43/25 |
| 2,005,081 | 6/1935 | Gephart | 43/18.1 |
| 2,018,923 | 10/1935 | Potter | 43/18.1 |
| 2,541,183 | 2/1951 | Abele | 43/20 |
| 2,546,280 | 3/1951 | Stein | 43/21.2 |
| 2,594,536 | 4/1952 | Beyer | 43/22 |
| 4,362,418 | 12/1982 | Loomis | 43/18.5 |
| 4,649,661 | 3/1987 | Myoto | 43/22 |

FOREIGN PATENT DOCUMENTS

| | | | |
|---|---|---|---|
| 2461453 | 3/1981 | France | 43/18.5 |
| 2081061 | 2/1982 | United Kingdom | 43/20 |

Primary Examiner—Nicholas P. Godici
Assistant Examiner—William Scott Andes
Attorney, Agent, or Firm—Stevens, Davis, Miller & Mosher

[57] ABSTRACT

A fishing rod is provided which includes a rod body which has a tail end portion having a grip and a fishing reel fixture mounted thereon. A cylindrical bend-correcting member is provided at the outer periphery of the rod body in front of the reel fixture. The bend-correcting member is intergral with the rod body and forwardly shifts the position of the base of a bending portion of the rod body. The bend-correcting member is made such that it is easy to hold at its outer periphery by an angler.

3 Claims, 2 Drawing Sheets

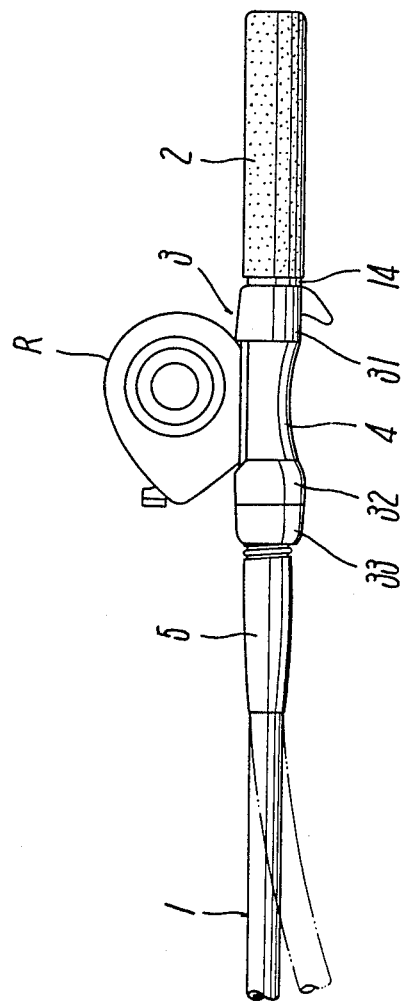
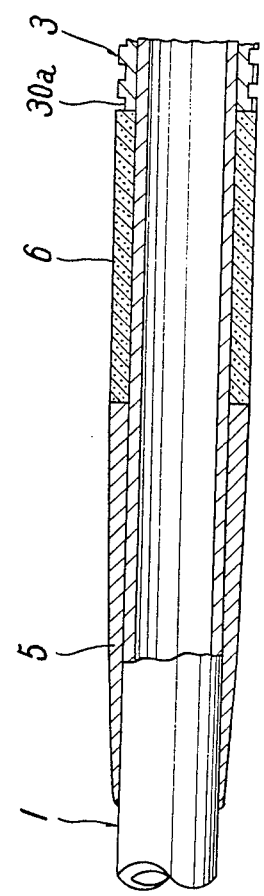

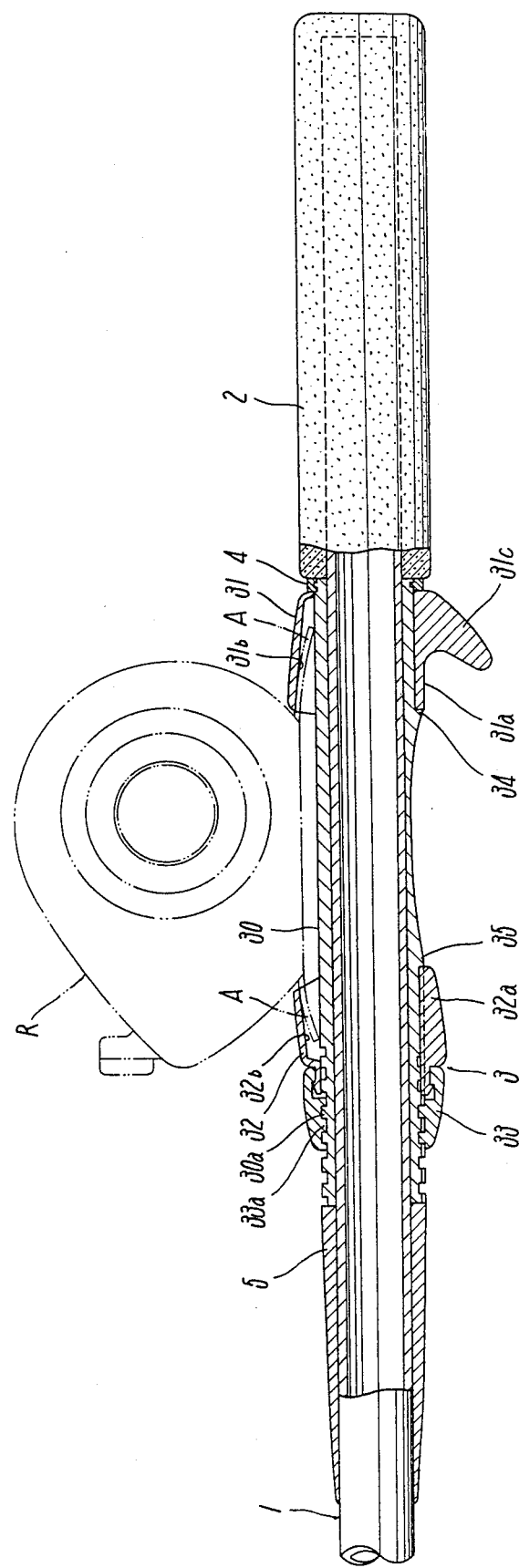

FISHING ROD

FIELD OF THE INVENTION

The present invention relates to a fishing rod, and more particularly, to a fishing rod which is provided with a fishing reel fixture and used mainly for bait casting.

BACKGROUND OF THE INVENTION

Conventionally, this kind of fishing rod has a grip at the tail end portion of a hollow and gently tapered conical rod body, with a fishing reel for mounting a fishing reel onto the fishing rod being provided at the front of the grip.

The reel fixture generally is provided with a base to be fixed to the rod body. On the base are mounted a fixed holder for receiving therein one lengthwise end of a mounting leg of the reel, a movable pusher for receiving therein the other end of the mounting leg, and a threaded ring for moving the movable pusher toward the fixed holder. When the reel fixture is mounted onto the rod body, the rigidity of the rod body is increased by the reel fixture, so that, when the rod body is subjected to a bending load, the rod body is bent at a position immediately in front of the reel fixture, in other words, the fore end of the base.

When a hooked fish is small, the angler grips only the grip on the tail end portion of the rod and winds up a fishing line by the reel to catch the fish. When a pulling force of the hooked fish is large, however, he grips the grip with one hand and holds with his other hand the rod body at the front of the reel fixture, thereby raising the entire fishing rod using both hands. In this case, the rod body is bent at an extreme angle from the bending point immediately in front of the reel fixture, making it difficult for him to hold with his other hand the rod body at the front of the reel fixture. Moreover, the rod body generally is smaller in diameter in front of the reel fixture, thereby making it further difficult to hold the rod body at this front position.

SUMMARY OF THE INVENTION

In light of the above problem, the present invention has been designed. An object thereof is to provide a fishing rod facilitating holding the rod body in front of the reel fixture and facilitating catching of big fish.

The present invention is characterized in that a fishing rod, which is provided at the tail end portion of a hollow and gently tapered conical rod body with a grip and in front thereof with a reel fixture for mounting a fishing reel onto the rod body. The fishing rod is provided at the outer periphery of the rod body in front of the reel fixture with a bend-correcting member which is cylindrical and integral with the rod body and forwardly shifts the position of the base of a bending portion of the rod body during fishing, with the bend-correcting member being made so that it is easy to hold at its outer periphery.

The rod body is formed preferably of prepreg made of high strength fiber impregnated with synthetic resin and baked under pressure. The bend-correcting member also is formed of the aforesaid prepreg, the prepreg being wound on the rod body when molded or after being molded so as to be integral therewith. Accordingly, the bend-correcting member is provided on the rod body to movably shift or correct the position of the base of the bending portion of the rod body toward the front of the rod body and correcting member. As a result, when a big fish is hooked, the rod body is bent in front of the correcting member, in other words, the rod body scarcely bends along the extent of the correcting member. Therefore, the correcting member, which has a larger diameter than the rod body, is provided at the rod portion which is held by the angler's one hand and does not bend. Hence, the correcting member can reliably be held to facilitate hooking a big fish. Moreover, the correcting member is made so that it is easy to hold at its outer surface.

The above and further objects and novel features of the invention will be more fully apparent from the following detailed description when considered with reference to the accompanying drawings.

BRIEF DESCRIPTION OF THE DRAWINGS

FIG. 1 is a partial side view of an embodiment of a fishing rod of the invention;

FIG. 2 is an enlarged side view of the FIG. 1 embodiment; and

FIG. 3 is an enlarged partial sectional view of a modified embodiment of the invention.

DETAILED DESCRIPTION OF THE PREFERRED EMBODIMENTS

Referring to the drawings, an embodiment of a fishing rod of the invention includes a rod body 1 which is made of prepreg and formed in a hollow and gently tapered conical shape. The prepreg comprises high strength fiber, such as carbon fiber or glass fiber, impregnated with synthetic resin, wound onto an iron core, and baked under pressure. Rod body 1 has at its larger diameter portion a tail end.

In addition, a jointed fishing rod comprises a plurality of rod bodies, the foremost smaller diameter rod body having the tip portion, and the rearmost larger diameter rod body having the tail end portion. A grip 2 composed preferably of soft material, such as EVA resin, is integrally sleeved and fixed onto the tail end portion and a fishing reel fixture 3 for mounting the fishing reel to rod body 1 is mounted in front of grip 2.

Reel fixture 3, as seen from FIG. 2, comprises a cylindrical base 30 having an inner diameter fitted onto rod body 1 and a screw thread 30a at one lengthwise side, a fixed holder 31 fixedly sleeved onto the other lengthwise side (the rear end) of cylindrical base 30, a movable pusher 32 fitted onto cylindrical base 30, so as to be axially movably with respect to fixed holder 31, and a threaded ring 33 rotatably connected to movable pusher 32 and threadably engaging screw thread 30a. Cylindrical base 30 is formed of prepreg of high strength fiber impregnated with synthetic resin, the prepreg being wound on the outer periphery of rod body 1, and has at its fore end the aforesaid screw thread 30a and at its rear end a lock nut 4 for fixing fixed holder 31. Alternatively, cylindrical base 30 may be formed separately from rod body 1, subsequently being fitted thereon and fixed thereto with an adhesive.

Fixed holder 31 and movable pusher 32 are provided with fitted cylinders 31a and 32a to be fitted onto cylindrical base 30. At the outer peripheral portions of fitting cylinders 31a and 32a are provided sockets 31b and 32b for receiving therein both ends of a mounting leg A of a fishing reel R respectively to thereby interpose leg A between sockets 31b and 32b. A finger hook 31c is integrally provided at the lower side of cylinder 31a.

Threaded ring 33 threadably engages cylindrical base 30 to move movable pusher 32 toward fixed holder 31, with mounting leg A at reel R being positioned between sockets 31b and 32b, whereby reel R is mounted to rod body 1.

A cylindrical bend-correcting member 5, which forwardly shifts or corrects the position of the base of the bending portion of rod body 1 during fishing, is integrally provided at the outer periphery of rod body 1 in front of reel fixture 3 and has an outer surface which is easy to hold by an angler's hand.

Specifically, as seen from FIG. 2, the prepreg, which is the same prepreg as in rod body 1, is integrally wound thereon in front of reel fixture 3 and baked under pressure, thereby forming bend-correcting member 5 having a larger diameter and greater rigidity than rod body 1. Correcting member 5 is round in section and is forwardly tapered at its outer periphery so as to be easy to hold. In addition, correcting member 5 is preferably formed of prepreg integrally wound on rod body 1 when molded, but the prepreg may be wound on rod body 1 after it is molded and baked under pressure. Also, correcting member 5 may, of course, be formed of a material other than prepreg, for preventing rod body 1 from bending.

Thus, the base of the bending portion of rod body 1 is moved in front of correcting member 5 before reel fixture 3. When the angler holds with both hands the fishing rod for catching a big fish, rod body 1, as shown by the phantom line in FIG. 1, is bent in front of correcting member 5. In other words, correcting member 5 having a greater rigidity is provided at the portion of rod body 1 held by his hand, whereby correcting member 5 and the portion of rod body 1 on which member 5 is mounted are not bent. Hence, the angler can readily and reliably hold correcting member 5, which is convenient for catching a big fish. Also, correcting member 5, which is round in section and tapered at its outer surface, further facilitates holding.

When reel fixture 3 and grip 2 are inserted onto rod body 1 from the tail end portion thereof, correcting member 5, which is integral with rod body 1 and provided in front of reel fixture 3, serves as a stopper therefor to accurately fix reel fixture 3 at a predetermined position. Moreover, correcting member 5 is made to be equal in its outer diameter to cylindrical base 30 to eliminate a stepped portion therebetween. Hence, even when the angler's hand gripping correcting member 5 shifts toward cylindrical base 30, the angler feels no foreign object and has a comfortable feeling.

Also, correcting member 5 formed of the same material as rod body 1 is brought into close contact directly therewith, thereby having improved strength against a bending load applied to rod body 1 and being readily made lightweight and highly rigid.

In the embodiment in FIG. 2, cylindrical base 30 is provided at both of its axially intermediate portions spaced at a predetermined interval with swollen portions 34 and 35 integral with base 30 and swollen radially outwardly thereof respectively. Accordingly, swollen portion 34 serves as a stopper for fitting cylinder 31a of fixed holder 31 to thereby position fixed holder 31, and swollen portion 35 serves as a stopper for fitting cylinder 32a of movable pusher 32, thereby restraining further movement thereof.

Alternatively, as shown in FIG. 3, a front grip 6 formed of a soft material, such EVA resin, may be provided between reel fixture 3 and bend-correcting member 5.

As seen from the above, in the fishing rod of the invention, at the outer periphery of rod body 1 in front of reel fixture 3 is integrally provided a cylindrical bend-correcting member 5 for correcting the position of the base of the bending portion at rod body 1 and the outer periphery of correcting member 5 is made easy to hold. Hence, correcting member 5 can reliably and easily be held so as to conveniently facilitate catching of big fish.

Although the invention has been described with reference to several different embodiments, these embodiments are merely exemplary and not limiting of the invention which is defined solely by the appended claims.

What is claimed is:

1. A fishing rod comprising:
  a gently tapered conical rod body including a tail end portion and a tip end portion respectively located at opposite ends of said rod body;
  a rear grip provided on said tail end portion;
  a fishing reel fixture mounted on said rod body at a position in front of said grip, said reel fixture comprising (i) a cylindrical base having an inner diameter adapted to receive said rod body therein and comprising a screw thread at an outer periphery of a lengthwise front portion thereof, (ii) a fixed holder fixed to a lengthwise rear portion of said cylindrical base, (iii) a movable pusher supported on said cylindrical base to be movable axially thereof, and (iv) a threaded ring threadably engaged with said screw thread;
  a bend-correcting means comprising a cylindrical member integral with said rod body and positioned in front of said reel fixture, for shifting in a direction toward said tip end portion, the position at which said rod body bends when subjected to a load from a hooked fish, said cylindrical member having an outer peripheral surface comprising means for facilitating holding thereof by an angler's hand; and
  a front grip mounted on said rod body between said reel fixture and said cylindrical member, said front grip being formed of a softer material than that forming said reel fixture and said cylindrical member,
  wherein said cylindrical member and said rod body are formed of prepreg comprising high strength fiber impregnated with synthetic resin, opposite surfaces of said cylindrical member and said front grip being in contact with each other, opposite surfaces of said front grip and said reel fixture being in contact with each other, an outer diameter of said cylindrical member at a rear end thereof being substantially equal to an outer diameter of said front grip at a front end thereof, an outer diameter of said front grip at a rear end thereof being substantially equal to an outer diameter of said cylindrical base of said reel fixture.

2. A fishing rod as in claim 1, wherein said cylindrical member has a conical shape and has a successively smaller outer diameter in a direction toward said tip end portion.

3. A fishing rod as in claim 1, wherein said cylindrical member and said rod body formed of prepreg are drawn together such that they are integral with each other.

* * * * *